Missing Page

Do Scan

[illegible] process
is not in print.

UNITED STATES PATENT OFFICE.

CADWALLADER EVANS, OF PITTSBURG, PENNSYLVANIA.

APPARATUS TO PREVENT EXPLOSION OF STEAM-BOILERS.

Specification forming part of Letters Patent No. 1,122, dated April 15, 1839; Reissue No. 225, dated November 23, 1852.

*To all whom it may concern:*

Be it known that I, CADWALLADER EVANS, of the city of Pittsburg, county of Allegheny, and State of Pennsylvania, have invented a new and Improved Mode of Preventing Steam-Boilers from Bursting; and I do hereby declare that the following is a full and exact description thereof, reference being had to the accompanying drawings and the letters of reference marked thereon.

The nature of my invention consists in the combination of a fusible alloy confined in a cup, tube, or case, with a metallic stem, rod, or other fixture not fusible at the melting temperature of the alloy, which stem, rod, or other fixture is held in position while the alloy remains hard, but when said alloy is fused said stem or its equivalent can move or have motion, by which movement any valve may be liberated or caused to open and let steam escape, giving notice of undue temperature, as well as relieving the boiler of excessive pressure of steam; or said stem may be placed in communication with any alarm or any index, so that this combination may act as an alarm, indicator, or safety apparatus.

Having described the nature of my invention, I wish now to proceed to describe one method of carrying it out, it being obvious that many plans and arrangements may be used which will produce substantially the same effect, and will still come within the scope of my invention, which does not depend upon any special arrangement of parts or upon the way in which the capability of movement of the rod, &c., in the alloy is caused to relieve pressure or give an alarm, or do both.

Figure 1 in the accompanying drawings represents a longitudinal section of a cylindrical boiler, A being the common safety-valve, resting on its seat and held down by the weight B. The lever C of this safety-valve is extended out beyond the standard which supports it, and enters a recess or opening cut away in the weight D, and which will allow the lever C to descend, should the safety-valve be opened in the ordinary way, by the pressure of steam. The weight D is supported on a rod or stem, which enters a brass tube or box, E, containing the alloy, upon the surface of which the foot of the stem rests. The tube or box E may extend to the depth of five or six inches, or, if preferred, as low as to the upper side of the flue, as shown by the dotted lines. It will be seen that the necessary result of this arrangement will be that as soon as the alloy melts the weight D will settle down on the end of the lever, counterbalancing the opposite weight, and, if the weight D be of greater weight than the opposite weight, will pull the safety-valve up, even if there was no pressure of steam in the boiler. On the other hand, it will be seen that the valve is at all times free to open independent of the melting of the alloy.

This mode of using alloys has many advantages over the old mode.

First. The alloy when placed in a tube is protected from any chemical action of the fire, steam, air, or water. Therefore its fusing temperature remains always the same as when first put into the apparatus.

Secondly. The alloy, not being wasted or blown away, can be used many times, even to thousands of meltings, thereby saving much expense in fuel, time, and trouble in renewing alloys, cooling down by putting out fires, pumping cold water into the boilers by hand, &c., before a new alloy can be replaced.

Thirdly. The melting of the alloy in this apparatus never causes improper loss of steam. All that will escape will be the surplus, because the moment the steam is reduced to or within the proper limits the apparatus can be reset, and not until then.

Fourthly. The melting of the alloy in this apparatus never causes a moment's delay. The boat proceeds on its trip as if the alloy had not melted unless there should be something so far wrong in the machinery as to require much time to repair.

Fifth. When the alloy melts and the escape of steam is going on, the apparatus can be used, as it were, as a thermometer by which the engineer can ascertain whether the escape of steam, together with his exertions to correct the evil, be available or not, because if the temperature remains up he cannot reset the apparatus.

Sixth. When this arrangement of alloy is attached to a common safety-valve, it has two modes of opening when there be plenty of water in the boilers, first, by the elastic force of the steam; secondly, by the temperature of the steam; and when there be a scarcity of water it makes no difference as to what may be the pressure of steam at the time, the heat alone will cause the valve to open.

Seventhly. A valve of two and half inches area, opening by heat, as by this apparatus, will let more steam escape than any two common safety-valves of six and a half inches diameter, because the first, having no resistance of a weight to overcome, opens full area, while the other, opening against the permanent weight at the end of the lever, will scarcely ever open over one-sixteenth of an inch above its seat.

Eighthly. When the alloy in this apparatus melts, the opening being made at the top of the boiler, there will be no waste of water.

Having described my invention and some of its advantages, I would say that I do not claim the use of an alloy to allow steam to escape through the opening in the boiler caused by its fusion; but I do claim as my invention and desire to secure by Letters Patent—

1. The combination of a fusible alloy confined in a cup, tube, or case, with a metallic stem, rod, or other fixture not fusible at the melting temperature of the alloy, which stem, rod, or other fixture is held or kept in position while the alloy remains hard, but when said alloy is fused said stem or its equivalent can move or have motion, by which liberty to move any valve may be liberated or caused to open and let steam escape, or any alarm may be let off or any index moved, so that this combination may act as an alarm, indicator, or safety-apparatus.

2. In combination with said alloy and plug, the heavy slotted weight, the lever C, or its equivalent and the safety or escape valve and its ordinary weight, acting in the manner and for the purposes herein specified.

C. EVANS.

Witnesses:

WM. P. EICHBAUM,
I. S. SMITH.